(12) United States Patent
Giannakopoulos et al.

(10) Patent No.: US 8,249,080 B1
(45) Date of Patent: Aug. 21, 2012

(54) ETHERNET TO MULTILANE OPTICAL TRANSPORT NETWORK TRAFFIC INTERFACE

(75) Inventors: Dimitrios Giannakopoulos, Methuen, MA (US); Matthew Ornes, Andover, MA (US); Matthew Brown, Kinburn (CA); Tracy Ma, Westford, MA (US)

(73) Assignee: Applied Micro Circuits Corporation, San Diego, CA (US)

( * ) Notice: Subject to any disclaimer, the term of this patent is extended or adjusted under 35 U.S.C. 154(b) by 75 days.

(21) Appl. No.: 12/959,211

(22) Filed: Dec. 2, 2010

Related U.S. Application Data

(63) Continuation of application No. 12/573,781, filed on Oct. 5, 2009, now Pat. No. 7,869,468, which is a continuation-in-part of application No. 12/483,711, filed on Jun. 12, 2009.

(51) Int. Cl.
*H04L 12/28* (2006.01)
*H04L 12/56* (2006.01)
*H04J 3/16* (2006.01)
*H04J 3/22* (2006.01)

(52) U.S. Cl. .................. 370/395.64; 370/401; 370/466

(58) Field of Classification Search ............. 370/395.64, 370/401, 466
See application file for complete search history.

(56) References Cited

U.S. PATENT DOCUMENTS

2004/0090995 A1* 5/2004 Kang et al. ................... 370/535

* cited by examiner

*Primary Examiner* — Ronald Abelson
(74) *Attorney, Agent, or Firm* — Law Office of Gerald Maliszewski; Gerald Maliszewski

(57) ABSTRACT

A system and method are provided for transporting a serial stream via a lower speed network using multiple parallel paths. At a transmitter, an optical or electromagnetic waveform is accepted representing a serial stream of digital information, and unbundled into n virtual information streams. Each virtual information stream is divided into a sequence of segments. Each segment is encapsulated, creating a sequence of packets by adding a start indicator to the beginning of each segment, and a terminate indicator to the end of each segment. Each packet is disinterleaved across m lanes and reinterleaved into n branches of framed data. Optical or electromagnetic waveforms representing the framed data are transmitted via n network branches. A receiver is also provided, which essentially reverses the above-described transmission method.

21 Claims, 10 Drawing Sheets

Fig. 2

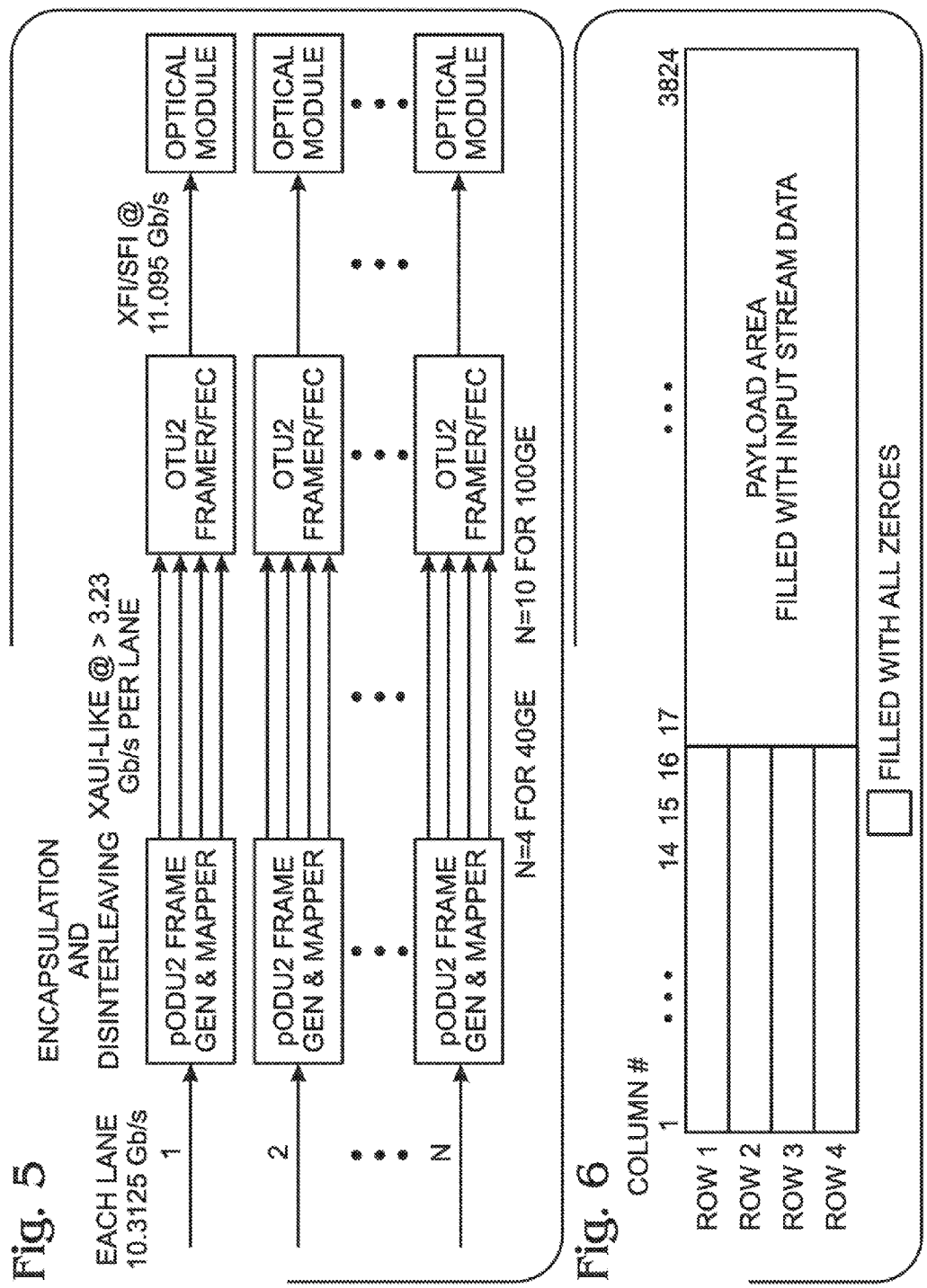

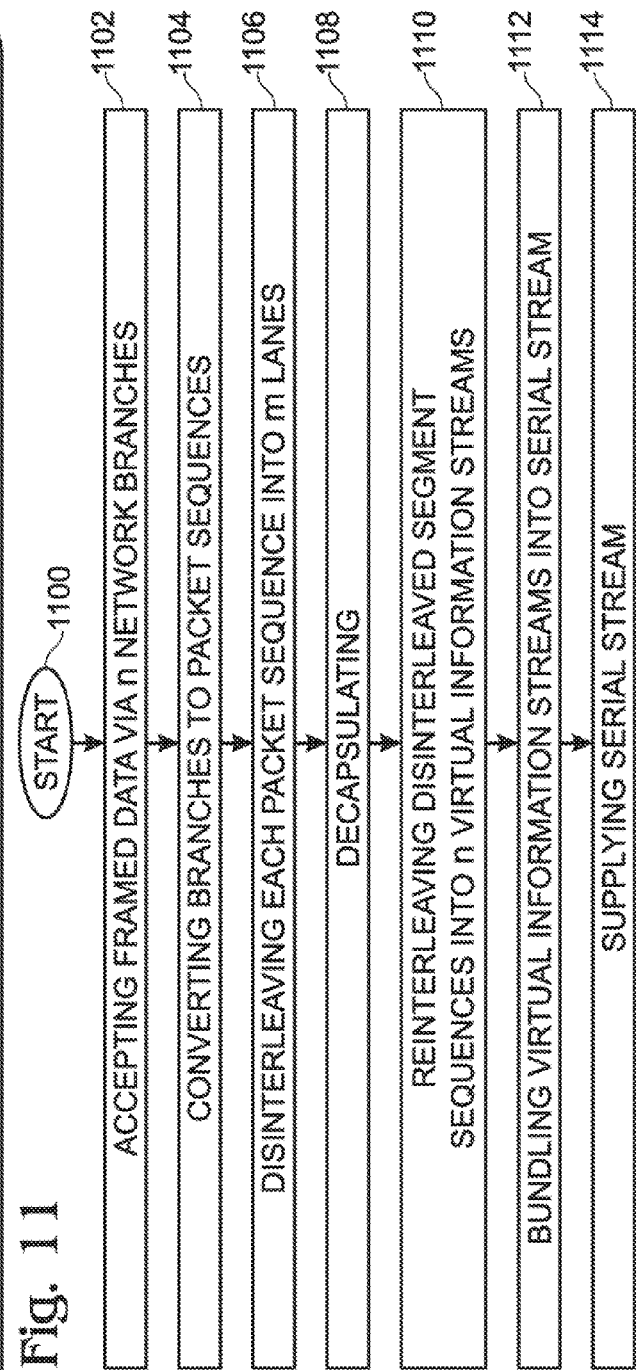

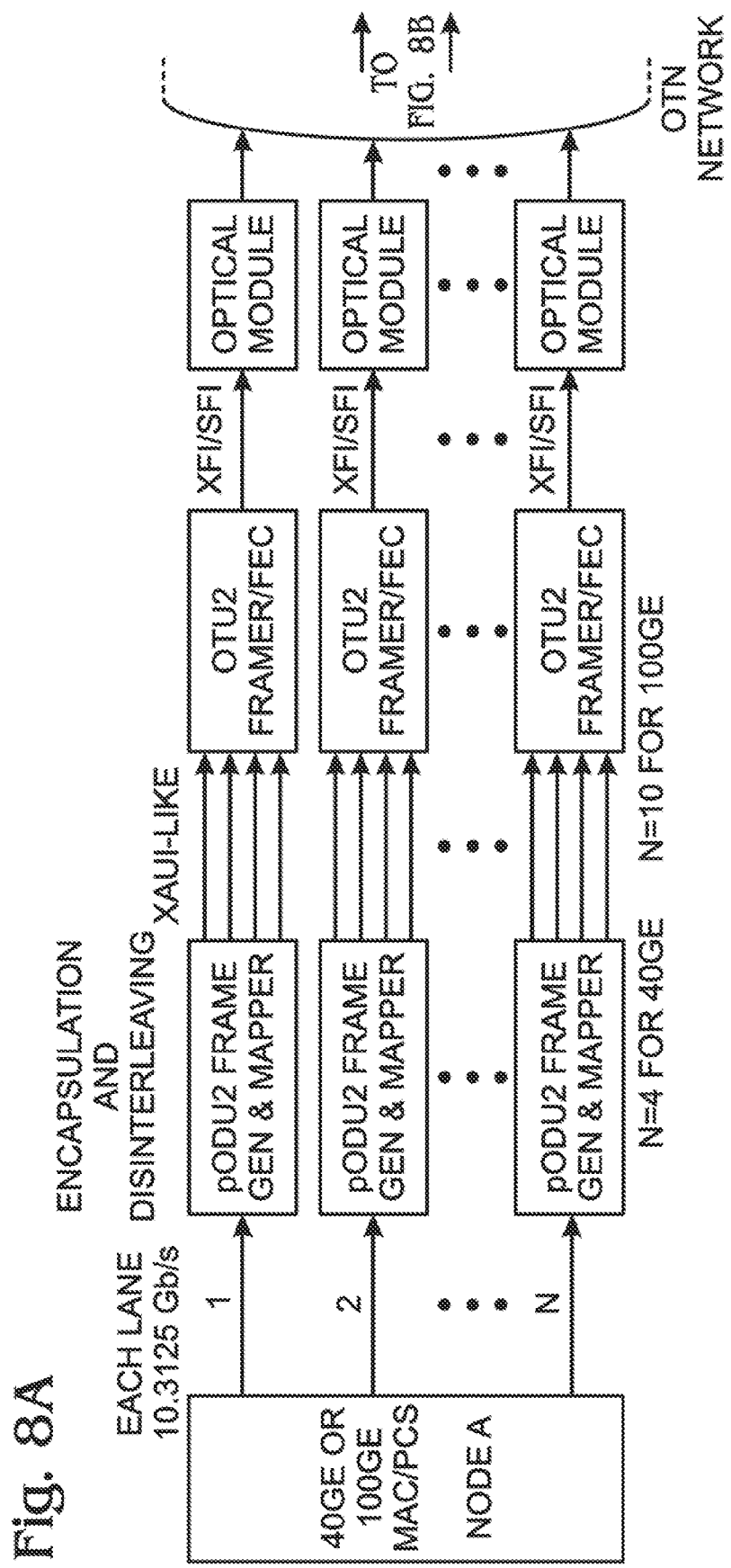

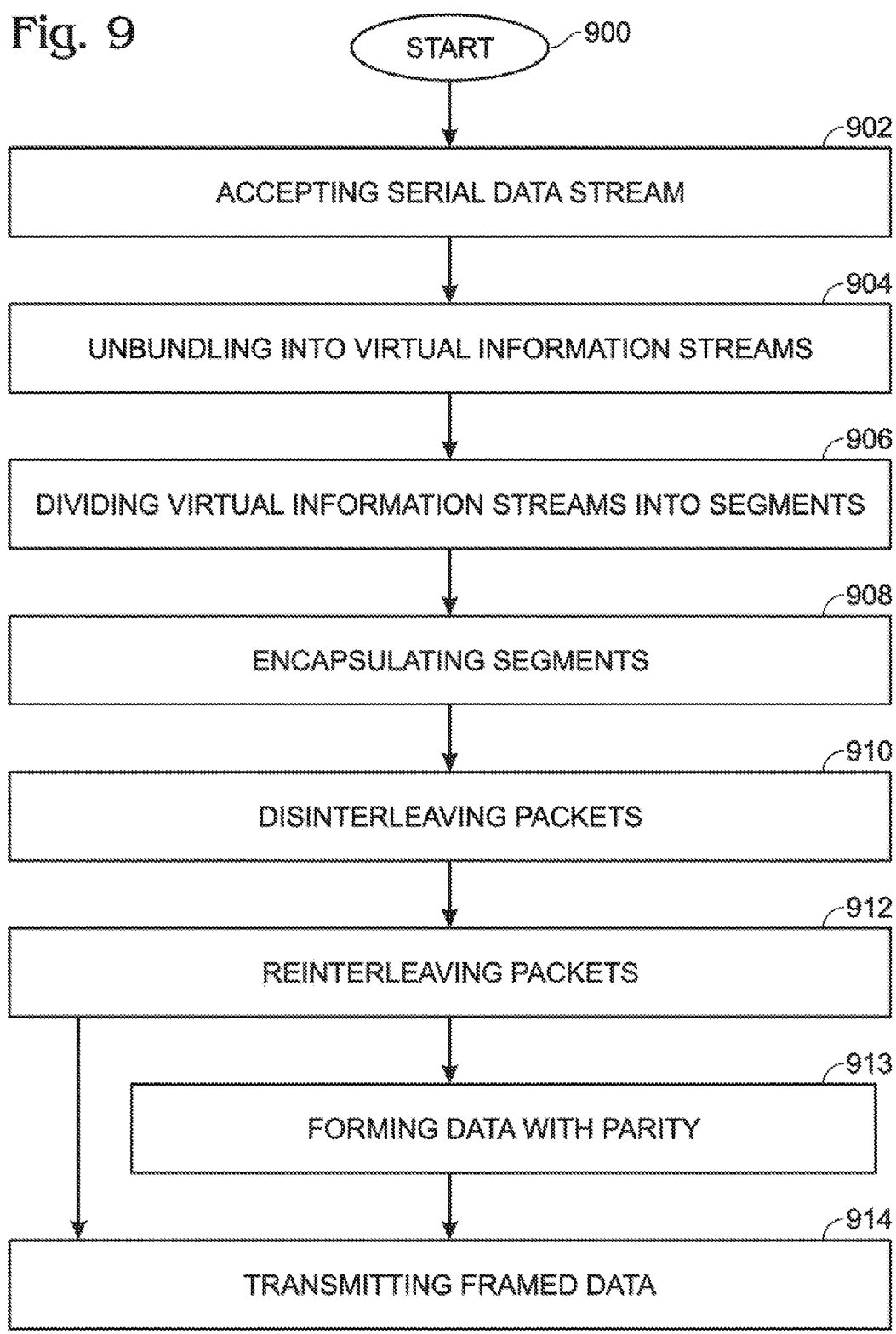

ETHERNET TO MULTILANE OPTICAL TRANSPORT NETWORK TRAFFIC INTERFACE

RELATED APPLICATIONS

This application is a Continuation a pending application entitled, TRANSPORT OF MULTILANE TRAFFIC OVER A MULTILANE PHYSICAL INTERFACE, invented by Dimitrios Giannakopoulos, Ser. No. 12/573,781, filed Oct. 5, 2009 now U.S. Pat. No. 7,869,468, which is;

a Continuation-in-Part of a pending application entitled, TRANSPORT OVER AN ASYNCHRONOUS XAUI-LIKE INTERFACE, invented by Matt Ornes, Ser. No. 12/483,711, filed Jun. 12, 2009. Both the above-mentioned applications are incorporated herein by reference.

BACKGROUND OF THE INVENTION

1. Field of the Invention

This invention generally relates to communications and, more particularly, to a system and method for the communication of a high-speed serial stream over multiple slower physical interfaces.

2. Description of the Related Art

XAUI is a standard for extending the XGMII (10 Gigabit Media Independent Interface) between the MAC and PHY layer of 10 Gigabit Ethernet (10 GbE). XAUI is a concatenation of the Roman numeral X, meaning ten, and the initials of Attachment Unit Interface. The XGMII Extender, which is composed of an XGXS at the MAC end, an XGXS at the PHY end and a XAUI between them, is used to extend the operational distance of the XGMII and to reduce the number of interface signals. Applications include extending the physical separation possible between MAC and PHY components in a 10 Gigabit Ethernet system distributed across a circuit board.

The XAUI interface is a simple, commonly used, standardized, and well understood protocol, with many different verification environments available. An enhanced version of the interface, referred to herein as XAUI-like, uses the same protocol as XAUI but can run at frequencies higher that the ones specified for XAUI (3.125 Gb/s).

XAUI uses simple signal mapping to the XGMII, and has independent transmit and receive data paths. Four lanes convey the XGMII 32-bit data and control per direction. Differential signaling is used with a low voltage swing (1600 mVpp), and 8b/10b encoding. A self-timed interface allows jitter control to the physical coding sublayer (PCS). XAUI shares technology with other 10 gigabit per second (Gb/s) interfaces and functionality with other 10 Gb/s Ethernet blocks.

The optional XGMII Extender can be inserted between the Reconciliation Sublayer and the PHY (physical layer) to transparently extend the physical reach of the XGMII and reduce the interface pin count from 72 to 16. The XGMII is organized into four lanes with each lane conveying a data octet or control character on each edge of the associated clock. The source XGXS converts bytes on an XGMII lane into a self clocked, serial, 8b/10b encoded data stream. Each of the four XGMII lanes is transmitted across one of the four XAUI lanes.

The source XGXS converts XGMII Idle control characters (interframe) into an 8b/10b code sequence. The destination XGXS recovers clock and data from each XAUI lane and deskews the four XAUI lanes into the single-clock XGMII. The destination XGXS adds to, or deletes from the interframe as needed for clock rate disparity compensation prior to converting the interframe code sequence back into XGMII Idle control characters. The XGXS uses the same code and coding rules as the 10 GBASE-X PCS and PMA specified in Clause 48 of the IEEE 802.3 Specification. Each of the 4 Receive and Transmit lanes operates at a rate of 3.125 Gbs/s.

Capabilities have been built into XAUI to overcome the inter-lane signal-skewing problems using a type of automatic de-skewing. Signals can be launched at the transmitter end of a XAUI line without precisely matching the routing of the four lanes, and the signals will be automatically de-skewed at the receiver.

The implementation of XAUI as an optional XGMII Extender is primarily intended as a chip-to-chip (integrated circuit to integrated circuit) interface implemented with traces on a printed circuit board. Where the XGMII is electrically limited to distances of approximately 2 to 3 inches, the XGMII Extender allows distances up to approximately 25 inches.

The XGMII Extender supports the 10 Gb/s data rate of the XGMII. The 10 Gb/s MAC data stream is converted into four lanes at the XGMII (by the Reconciliation Sublayer for transmit or the PHY for receive). The byte stream of each lane is 8b/10b encoded by the XGXS for transmission across the XAUI at a nominal rate of 3.125 GBaud. The XGXS at the PHY end of the XGMII Extender (PHY XGXS) and the XGXS at the RS end (DTE XGXS) may operate on independent clocks.

The XGMII Extender is transparent to the Reconciliation Sublayer and PHY device, and operates symmetrically with similar functions on the DTE transmit and receive data paths. The XGMII Extender is logically composed of two XGXSs interconnected with a XAUI data path in each direction. One XGXS acts as the source to the XAUI data path in the DTE transmit path and as the destination in the receive path. The other XGXS is the destination in the transmit path and source in the receive path. Each XAUI data path is composed of four serial lanes. All specifications for the XGMII Extender are written assuming conversion from XGMII to XAUI and back to XGMII, but other techniques may be employed provided that the result is that the XGMII Extender operates as if all specified conversions had been made. One example of this is the use of the optional XAUI with the 10 GBASE-LX4 8b/10b PHY, where the XGXS interfacing to the Reconciliation Sublayer provides the PCS and PMA functionality required by the PHY. An XGXS layer is not required at the PHY end of the XAUI in this case. However, means may still be required to remove jitter introduced on the XAUI in order to meet PHY jitter requirements.

Other conventional protocols used to carry frames (or framed data) include, but are not limited to, the following protocols that have 10G embodiments: SFI (SFI-4.x), SFI-5S, TFI (TFI-4.x), and XFI. Other 10G protocols and other non-10G protocols are also used to carry frames (or framed data).

There is standardization effort in progress within IEEE for 40GE and 100GE LAN, but the standard is not expected to be published until June 2010. There is also a standardization effort within ITU-T for mapping 40GE clients into ODU3 and 100GE into ODU4, but this is also not complete yet.

With the demand for more bandwidth growing internationally, and the higher speed Ethernet protocols such as 40GE and 100GE under standardization, Telecom providers are looking for ways to transport these high speed bit framed protocols over OTN networks. OTN (Optical Transport Network) has become one of the dominant technologies for transporting a wide variety of clients over distances in the excess of 100 Km.

In order for network carriers to transport the equivalent of 40 Gb/s Ethernet today, they need to use four 10 Gigabit Ethernet (10GE) sets of systems, each system integrating a 10GE MAC, PCS and PMA separate layer, as well as 4 OTN Framer/Mappers with independent NMS (Network Management System) functions. It also limits the maximum rate for each MAC stream to ~10 Gb/s.

It would be advantageous if framed or non-framed data could be carried through high data rate Ethernet protocols using existing XAUI-like interfaces.

SUMMARY OF THE INVENTION

The system disclosed herein addresses the problem of transporting 40GE or 100GE traffic over Optical Transport Network (OTN) networks using 10 Gb/s paths. One advantage to this system is that it uses proven 10 Gb/s technology at all layers, the Ethernet layer as well as the OTN layer, so the 10 Gb/s streams can be transported over existing OTN networks and optical equipment without modifications. This system provides a cost effective way for Telecom providers to transport the traffic without costly upgrades.

In one aspect, each path of disinterleaved 40GE or 100GE traffic is encapsulated (mapped) to OTN format, which is then treated as a pseudo packet by the XAUI-like interface. In addition, the use of a proven interface such as XAUI (and XAUI-like protocols compatible with XAUI) can be easily implemented in today's field programmable gate arrays (FPGAs), so system vendors can integrate the solution in a straightforward way. However, the use of other interfaces is not precluded, as long as they can provide the transfer of the OTN frame in a similar way to the XAUI-like interface, i.e. preserving the OTN format and rate.

The disclosed system requires only one media access control (MAC) and one physical coding sublayer (PCS) (40GE or 100GE) layer in total and extends the MAC rate to 40 Gb/s or 100 Gb/s, with one network management system (NMS) for the whole link since the aggregate stream is 40GE or 100GE.

Since the system uses existing 10 Gb/s ICs and technologies, it provides an immediate solution to the transport of protocols that are faster than 10 Gb/s. It can also use Forward Error Correction schemes in order to achieve longer distance transmission than the conventional ITU-T G.709 specified FEC scheme. More explicitly, the system may carry n bit streams (4 for 40GE, 10 for 100GE) over an OTN network via the use of a XAUI-like interface. The incoming n bit streams might be asynchronous to the XAUI-like interface (or other similar interface, e.g., 10 GBASE-KX4/CX4/LX4) transport rate.

Accordingly, a method is provided for transporting a high speed serial stream via a lower speed network using multiple parallel paths. At a transmitter, an optical or electromagnetic waveform is accepted representing a serial stream of digital information, and unbundled into n virtual information streams. Each virtual information stream is divided into a sequence of segments. Each segment is encapsulated, creating a sequence of packets by adding a start indicator to the beginning of each segment, and a terminate indicator to the end of each segment. Each packet is disinterleaved across m lanes and reinterleaved into n branches of framed data. Optical or electromagnetic waveforms representing the framed data are transmitted via n network branches.

A receiving method is also provided for transporting a high speed serial stream via a lower speed network using multiple parallel paths. The receiver accepts optical or electromagnetic waveforms representing framed data, received via n network branches. Each branch of framed data is converted into a sequence of packets. Each sequence of packets is disinterleaved into m lanes and then reinterleaved into n parallel packet sequences. Each packet is decapsulated, creating a sequence of segments by removing a start indicator from the beginning of each packet, and a terminate indicator from the end of each packet. Each sequence of segments is combined into a virtual information stream. The n virtual information streams are bundled into a serial stream of digital information and supplied as either an optical or electromagnetic waveforms representing the serial stream.

Additional details of the above-described methods, and a transmitter and receiver for transporting a high speed serial stream via a lower speed network using multiple parallel paths, are provided below.

BRIEF DESCRIPTION OF THE DRAWINGS

FIG. 2 is a schematic diagram depicting a receiver for transporting a high speed serial stream via a lower speed network using multiple parallel paths.

FIG. 5 is a schematic diagram depicting one exemplary embodiment of the transmitter depicted in FIG. 1.

FIG. 6 depicts the pODU2 frame format.

FIG. 7 depicts a second method for mapping the input stream into the OPU payload area with stuff bytes.

FIGS. 8A and 8B are a schematic block diagram depicting the above-described example in the context of an entire network.

FIG. 9 is a flowchart illustrating a method for transporting a high speed serial stream via a lower speed network using multiple parallel paths.

FIG. 11 is a flowchart illustrating an alternate method for transporting a high speed serial stream via a lower speed network using multiple parallel paths.

DETAILED DESCRIPTION

Figure 1:
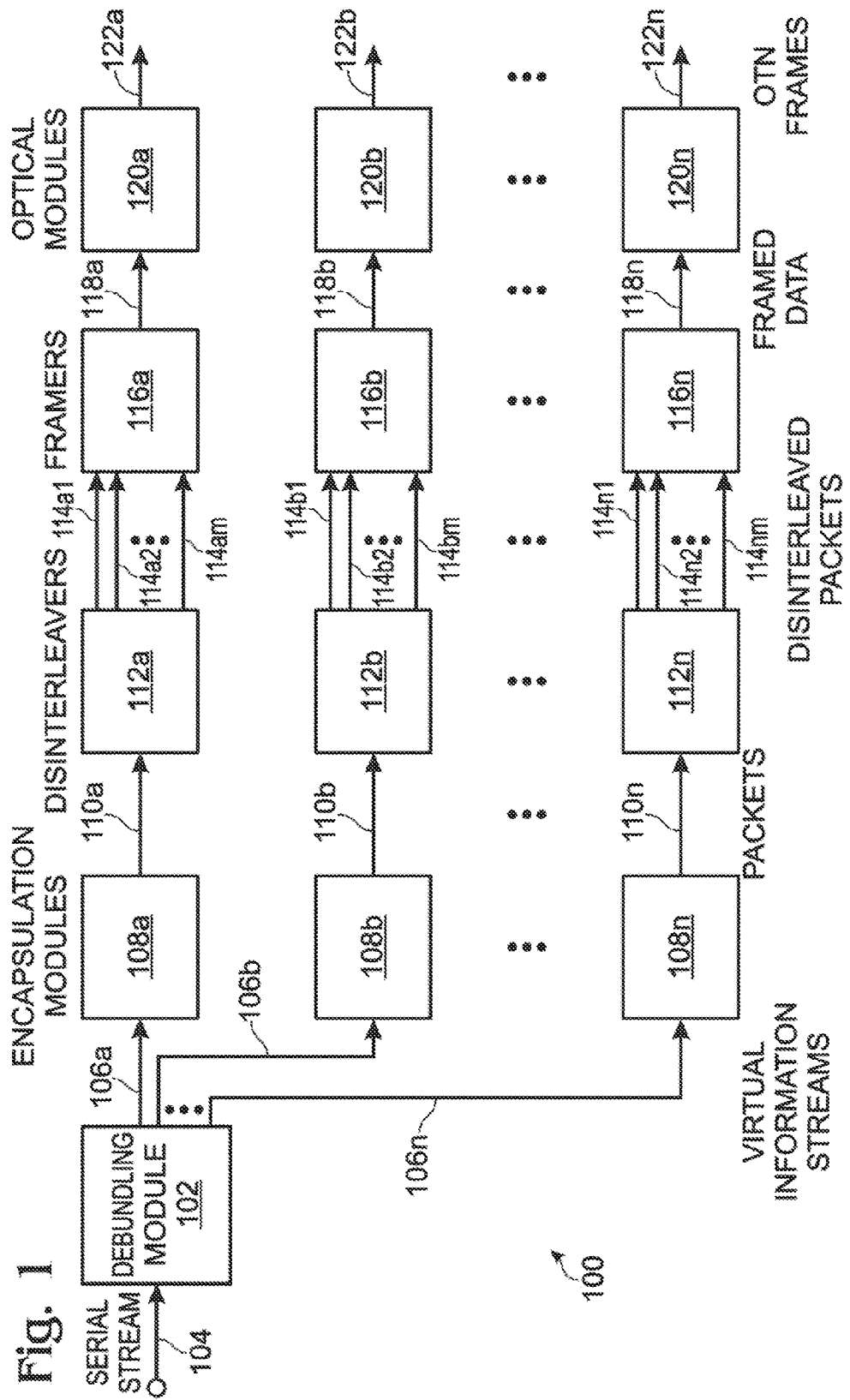
FIG. 1 is a schematic block diagram of a transmitter for transporting a high speed serial stream via a lower speed network using multiple parallel paths.

FIG. 1 is a schematic block diagram of a transmitter for transporting a high speed serial stream via a lower speed network using multiple parallel paths. The transmitter 100 comprises a debundling module 102 having an input on line 104 to accept either an optical or electromagnetic waveform representing a serial stream of digital information. For example, the interface on line 104 may be connected to an upper layer as expressed by the International Organization for Standardization (ISO) 7-layer model. The debundling module 102 has outputs on lines 106a through 106n to supply the serial stream unbundled into n virtual information streams. Note: n is variable not limited to any particular value. In one aspect, the debundling module 102 accepts 40 gigabit Ethernet (GE) or 100GE protocol information. In another aspect, the debundling module 102 unbundles the serial stream into n virtual information streams of framed data, where each frame includes a lane alignment marker.

(n) encapsulation modules, 108a through 108n, are shown. Each encapsulation module 108 has an input on line 106 to accept a virtual information stream. Each encapsulation module 108 divides a virtual information stream into a sequence of segments, encapsulating each segment to create a packet by adding a start indicator to the beginning of each segment and a terminate indicator to the end of each segment. Each encapsulation module 108 has an output 110 to supply a sequence of packets. In one aspect, each encapsulation module 108 creates a packet by adding a start character to the beginning of each segment and a terminate character to the end of each segment. In another aspect, the first character in the segment can be replaced with a Start character, and restored after reinterleaving, in the 40GE or 100GE case, since its value is known.

Generally, a character is defined herein as a digital word of one or more bits. Some exemplary encapsulation characters include post-start characters added subsequent to the start character, inter-packet characters added subsequent to the termination character, or a combination of post-start and inter-packet characters. Further, the post-start and inter-packet characters may be idle characters, fill-data characters, or in-band communication channel characters.

Start, inter-packet, and terminate characters are special multi-bit symbols or words with a pattern of bit values recognized by communicating devices as having a special significance. As such, these bit patterns can be used for control and for the establishment of boundaries between packets. This concept of control characters is well understood in the art. There are special 4-word (4-character) sequences defined in XAUI that are used for "link status" indication (called "sequence ordered-sets"), which can be used for inter-packet characters. As noted in parent application Ser. No. 12/483, 711, there are a number of means of encapsulating segments, which are incorporated herein by reference.

The IEEE 802.3 standard outlines a XAUI interface protocol that is logically equivalent to the 10 GBASE-LX4 protocol used for the transport of variable sized 10GEthernet packets/frames. The XAUI/10 GBASE-LX4 protocol provides for packet-framing of the Ethernet packet using a /S/ start character and a /T/ termination character, as well as /I/ idle characters for sync, align, and rate adaptation.

These same /S/ start, /T/ termination, and /I/ idle characters (within //S// start, //T// termination, and Mil idle ordered sets), as well as other encapsulation characters, are compliant with the 802.3 XAUI/10 GBASE-LX4 standards, but the encapsulated "packet" is a packet/frame (or a portion of a frame that has been segmented) other than 10G Ethernet.

(n) disinterleavers, 112a through 112n, are shown. Each disinterleaver 112 has an input on line 110 to accept a sequence of packets and m outputs on lines 114a through 114m to supply packets disinterleaved into m lanes. (n) framers, framers 116a through 116n, are shown. Each framer 116 has m inputs on lines 114 to accept the disinterleaved packets. Each framer 116 reinterleaves the packets, and has an output on line 118 to supply either an optical or electromagnetic waveforms representing framed data. Note: m is a variable not limited to any particular value.

In one aspect, each framer 116 converts the reinterleaved packets into data framed with parity information. In another aspect, the transmitter 100 further comprises n optical modules 120. Each optical module 120 has an input on line 118 to accept the data framed with forward error correction (FEC), and an output on line 122 to supply waveforms representing Optical Transport Network (OTN) frames. For example, the optical modules 120 supply OTUk format frames.

It should be understood that the transmitter 100 may be asynchronous with respect to the input serial data stream on line 104. Thus, there may be variations in the two clocks controlling lines 104 and 122. However, encapsulation characters can be used as fill characters to compensate for these variations.

Figure 2:
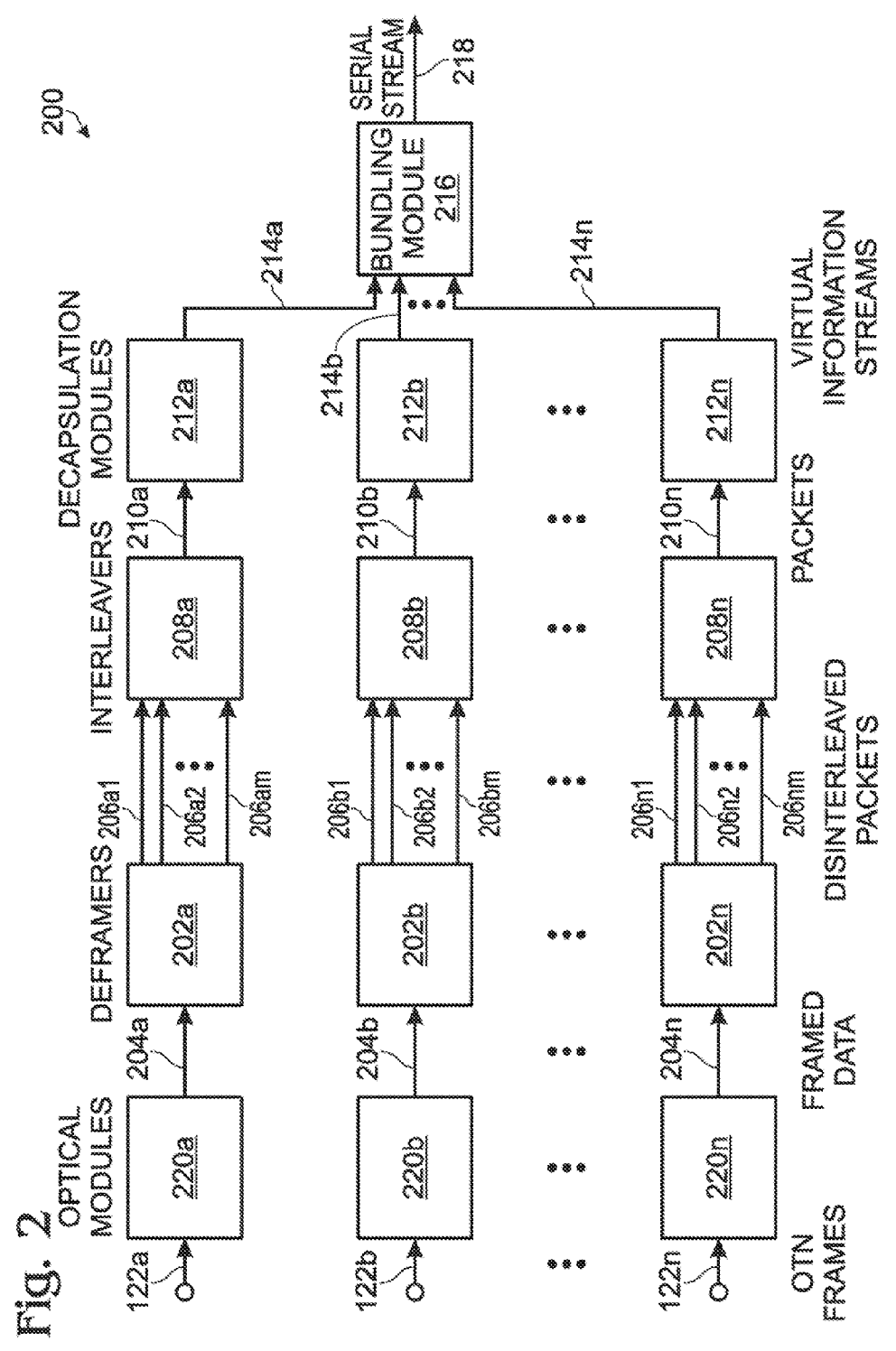

FIG. 2 is a schematic diagram depicting a receiver for transporting a high speed serial stream via a lower speed network using multiple parallel paths. The receiver 200 comprises n deframers 202. Each deframer 202 has an input on line 204 to accept optical or electromagnetic waveforms representing framed data. Each deframer 202 has m outputs on lines 206 to supply packets disinterleaved into m lanes. In one aspect, each deframer 202 accepts data framed with parity information and uses parity information to make corrections to the framed data. In another aspect, the receiver further comprises n optical modules 220. Each optical module 220 has an input on line 122 to accept waveforms representing OTN frames and an output on line 204 to supply data framed with FEC to a corresponding deframer 202. For example, the optical modules 220 accept OTUk format frames, where k is a variable such as 2 or 3.

(n) interleavers 208 are shown. Each interleaver 208 has m inputs on line 206 to accept the disinterleaved packets and an output on line 210 to supply a sequence of reinterleaved packets. (n) decapsulation modules 212 are shown. Each decapsulation module 212 has an input on line 210 to accept a sequence of reinterleaved packets. Each decapsulation module 212 decapsulates each packet to create a segment by removing a start indicator from the beginning of each packet and a terminate indicator from the end of each packet. Each decapsulation module 212 has an output on line 214 to supply a sequence of segments combined into a virtual information stream. In one aspect, each decapsulation module 212 creates a segment by removing a start character to the beginning of each packet and a terminate character to the end of each packet.

A bundling module 216 has n inputs on line 214 to accept n virtual information streams. The bundling module 216 bundles the n virtual information streams, and has an output on line 218 to supply an optical or electromagnetic waveform representing a serial stream of digital information. In one aspect, the bundling module 216 may supply 40 gigabit Ethernet (GE) or 100GE information. In another aspect, the bundling module 216 accepts n virtual streams of framed data on lines 214, where each frame includes a lane alignment marker.

Figure 3:
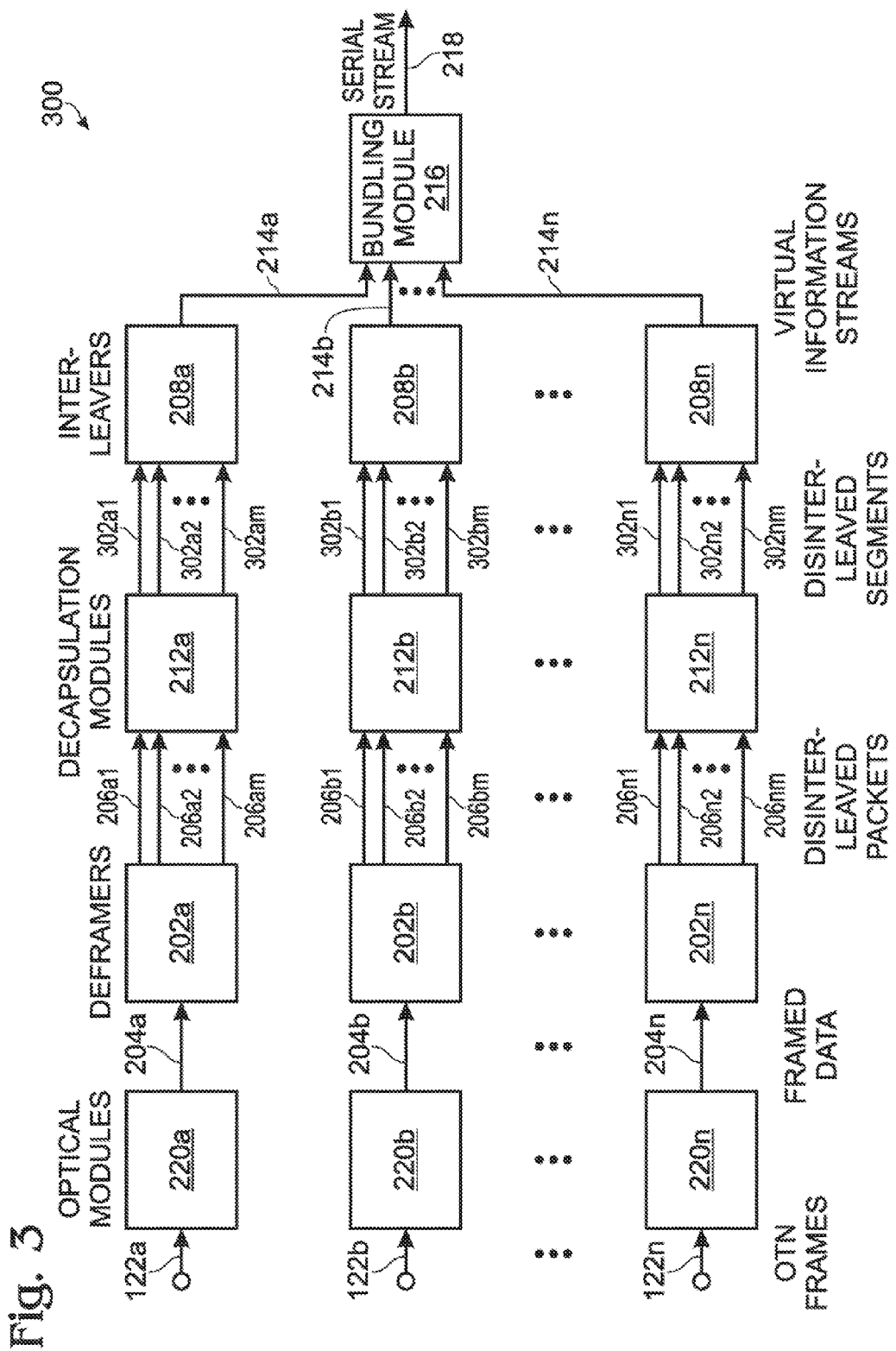
FIG. 3 is a schematic block diagram of a variation of the receiver of FIG. 2.

FIG. 3 is a schematic block diagram of a variation of the receiver of FIG. 2. Generally, the receiver 300 of FIG. 3 is the same as the receiver of FIG. 2, except that placement of the decapsulation modules and interleavers has been reversed. As in FIG. 2, there are n deframers 202, as described above. This receiver may also employ optical modules 220. (n) decapsulation modules 212 are shown. Each decapsulation module 212 has m inputs on line 206 to accept disinterleaved packets. Each decapsulation module 212 decapsulates a disinterleaved packet to create a disinterleaved segment by removing a start indicator from the beginning of each disinterleaved packet and a terminate indicator from the end of each disinterleaved packet. Each decapsulation module 212 has an m outputs on line 302 to supply m sequences of disinterleaved segments.

(n) interleavers 208 are shown. Each interleaver 208 has m inputs on lines 302 to accept m sequences of disinterleaved segments, and an output on line 214 to supply a virtual information stream of reinterleaved segments. A bundling module 216 has n inputs on line 214 to accept n virtual information streams and an output on line 218 to supply a serial stream of digital information, as described above.

Although not explicitly shown, a variation of the transmitter of FIG. 1 could likewise be enabled by reversing the positions of the encapsulation and disinterleaving modules.

Figure 4:
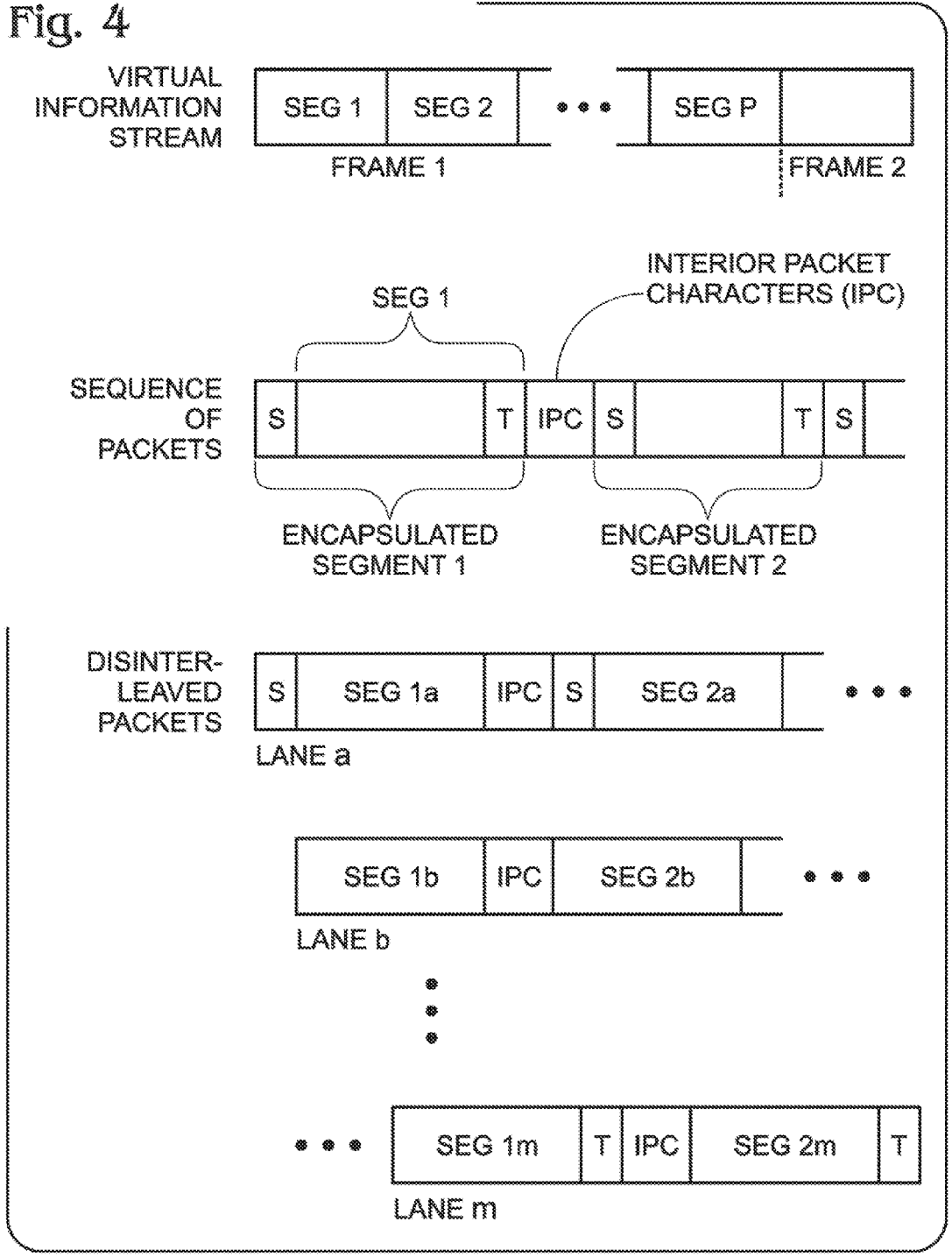
FIG. 4 is a diagram depicting a transmitter encapsulation example.

FIG. 4 is a diagram depicting a transmitter encapsulation example. Each encapsulation module (108, see FIG. 1) accepts a virtual information stream of framed data, which may (as shown) include lane alignment markers. An inter packet gap (IPG) separates frames 1 and 2, which permits adaptation to a higher rate clock. Each virtual information stream is divided into a sequence of segments (SEG). For simplicity it is assumed that each virtual information stream includes p segments. Each segment is encapsulated to create a packet by adding a start indicator (S) to the beginning of each segment and a terminate indicator (T) to the end of each segment. Each encapsulation module supplies a sequence of packets.

Each disinterleaver accepts a sequence of packets, and supplies packets disinterleaved into m lanes. To simplify the drawing, it is assumed that the segments are evenly distributed across the lanes so that start indicators for each segment occur in lane a, and terminate indicators all occur in lane m. In actual practice, there is no requirement that the segments be evenly distributed. The group of disinterleaved packets is reinterleaved into a single stream of framed data (not shown).

Functional Description

In order for conventional network carriers to transport the equivalent of 40 Gb/s Ethernet, four 10 Gigabit Ethernet (10GE) sets of systems must be used, each system integrating a 10GE MAC, PCS and PMA separate layer, as well as 4 OTN Framer/Mappers with independent NMS (Network Management System) functions. Further, the maximum rate for each MAC stream is limited to ~10 Gb/s. The systems depicted in FIGS. 1-3 require only one MAC and one PCS (40GE or 100GE) layer in total, and extend the MAC rate to 40 Gb/s or 100 Gb/s, with one NMS for the whole link since the aggregate stream is 40GE or 100GE. A XAUI-like interface, or any other common interface, may be used as a system interface to transfer the data between ICs.

FIG. 5 is a schematic diagram depicting one exemplary embodiment of the transmitter depicted in FIG. 1. The system has either 4 inputs for 40GE, or 10 inputs for 100GE bit streams, each running at a frequency of 10.3125 Gb/s, per the IEEE 802.3ba Draft specification rev1.2. The process creates an ODU2-like frame for each input bit stream, and then maps each input bit stream to the OPU2 (payload area) of the ODU2-like frame.

The clock with which the transported ODU-2 frame is transmitted over the OTN network is 255/237 or 255/238 of the input bit stream payload of 10.3125 Gb/s. Since the process is agnostic to the format or protocol of the input bit stream, it can be used for other client types/rates also.

The input 10.3125 Gb/s data streams are mapped into the ODU2-like frames (referred to herein as pODU2 for pseudo-ODU2). Each resulting pODU2 is encapsulated into its correspondent XAUI-like interface and fed into the framer, which adds OTN OH (overhead) and FEC (Forward Error Correction).

FIG. 6 depicts the pODU2 frame format. The frame is compatible to the one defined in the ITU-T G.709 standard, and has the same number of rows and columns. None of the OTU2 OH or ODU OH or OPU2 OH bytes are populated with meaningful values, and they can all be set to zero. The payload area is filled with the input stream data, and there is no requirement for the input data to be aligned (e.g. byte aligned) with the pODU2 frame byte boundaries.

Mapping of the input stream data into the OPU payload area is bit synchronous. In more detail, the OPU payload area rate is synchronous to the input bit stream rate, which is 10.3125 Gb/s. In addition, the pODU2 rate is frequency locked (synchronous) to the input bit stream rate. The OTU-2 line rate is frequency synchronous to the input stream rate, as well, scaled appropriately to accommodate for the OTN OH addition. Therefore, there is no rate adaptation needed for the mapping of the input bit stream to the pODU2, or the encapsulation of the pODU2 into the OTU-2 that is transmitted in the line. The only clock that may be (but is not required to be) asynchronous is the XAUI-like clock. In an alternate clocking scheme, all clocks (including the XAUI-like clock) can be synchronous to the input bit stream rate. In all clocking schemes, though, there is a requirement that the XAUI-like clock has a sufficiently high frequency in order to be able to accommodate for the 8B/10B protocol encoding as well as the added overhead (such as the /S/ or /T/ characters, etc.).

There are 2 different ways to map the input stream into the OPU payload area, the one (shown in FIG. 6) is with filling the OPU payload area with the input data. In this case, the pODU2 rate is 239/238 of the input bit rate, so it is (239/238)*10.3125 Gb/s=10.355829 Gb/s (+/−100 ppm). The XAUI-like rate must be at least 3.237 Gb/s per lane, which is the resulting rate after encoding the pODU2 frame with an 8b/10b encoder and striping the stream into the m XAUI-like lanes. If RXAUI is used, m=2. The XAUI-like rate does not need to be clock synchronous to the input bit stream rate.

FIG. 7 depicts a second method for mapping the input stream into the OPU payload area with stuff bytes. For each row, 16 fixed stuff bytes are defined, for a total of 64 per pODU2 frame. These bytes are not filled with payload data, they are filled with zeroes. In this case, the pODU2 rate is 239/237 of the input bit rate, so it is (239/237)*10.3125 Gb/s=10.39952 Gb/s (+/−100 ppm). The XAUI-like rate must be at least 3.250 Gb/s per lane, which is the resulting rate after encoding the pODU2 frame with an 8b/10b encoder and striping the stream into the 4×AUI-like lanes. The XAUI-like rate does not need to be clock synchronous to the input bit stream rate.

The next step is encapsulating the pODU2 frame into the XAUI interface protocol. The XAUI interface protocol is similar to the XAUI-like interface protocol. In this process, the pODU2 bytes are encoded using a 8b/10b scheme per the IEEE 802.3 standard, with the addition of special characters (such as Align) required by the protocol. The first byte of the pODU2 frame (row 1, column 1) is replaced with the 8b/10b encoded /S/ start character that will be placed in lane 0 of the XAUI interface.

The pODU2 frame is decapsulated from its XAUI protocol and fed to the Frame and OH Generator circuits, where framing bytes are added and the OTU2/ODU2/OPU2 OH (Overhead) is populated in compliance with the OTN standards. Then, the FEC parity bytes are generated and added. The resulting stream is serialized and transported over the Line side XFI/SFI interface. The resulting OTU2 frame/bit stream is compatible with the one specified in the ITU-T G.709 standard and, therefore, can be transported over an OTN link with no modifications.

The bit rate of the output bit stream is 255/239 of the pODU2 frame and is frequency locked to it, so it is (255/239)*10.355829 Gb/s=11.0491 Gb/s (no fixed stuff), or it is (255/239)*10.39952 Gb/s=11.0957 Gb/s (with fixed stuff).

Figure 8B:
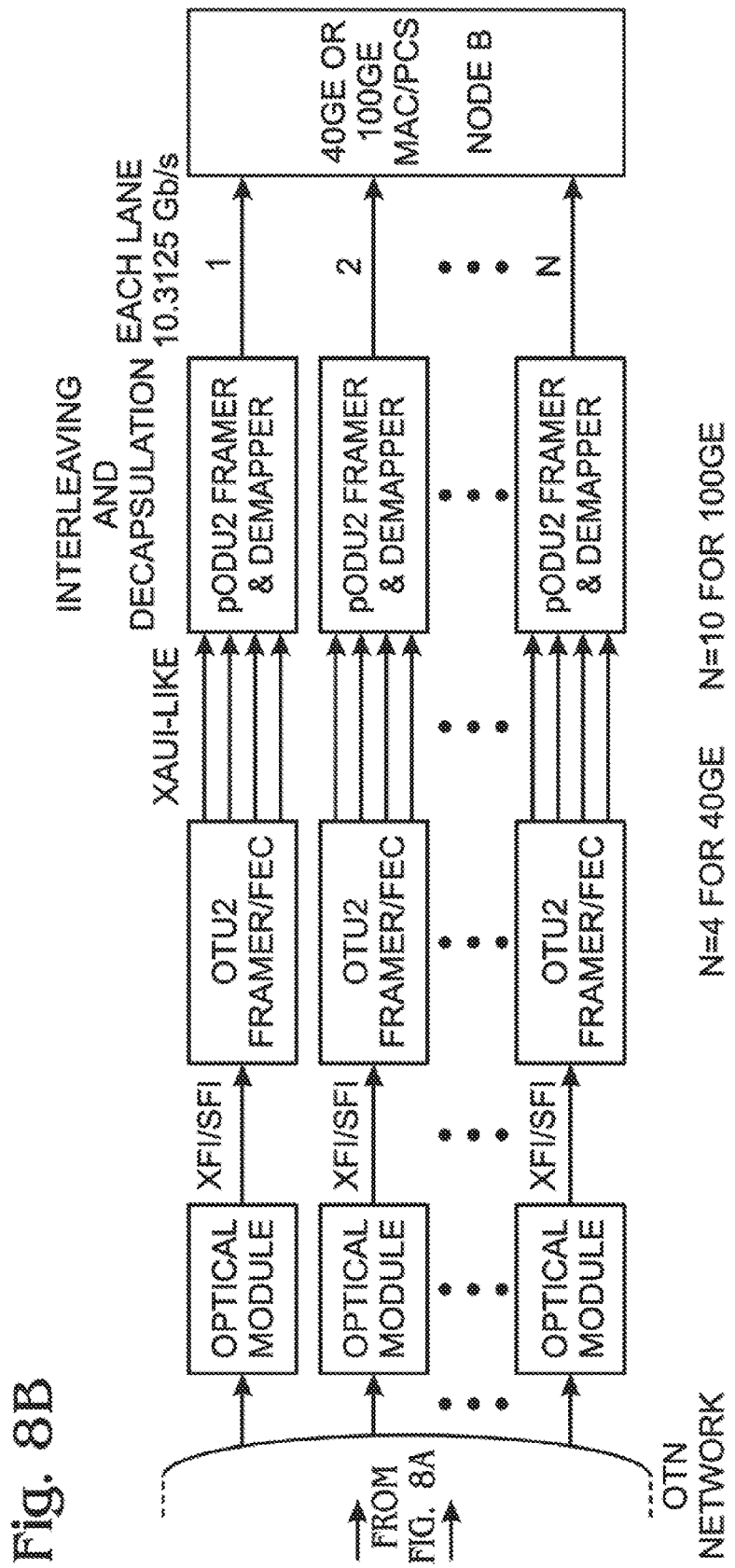

FIGS. 8A and 8B are a schematic block diagram depicting the above-described example in the context of an entire network. At the system level, all 4 (for 40GE) or 10 (for 100GE) output bit streams are transported over the OTN network (one traffic direction is shown). In more detail, the 40GE (or 100GE) MAC/PCS source at Node A generates the 40GE (or 100GE) packets, adds the 40GE (or 100GE) PCS layer and disinterleaves them into the 4 (or 10) lanes (input bit streams for the next stage). It then sends them over to the pODU2 Frame Generator and Mapper, which maps them into a pODU2 frame. The traffic is encapsulated over XAUI-like interface to each framer, which adds OTN OH and FEC and then feeds the individual streams to the optical modules for transmission over the OTN network.

At the receiving end, each deframer frames up the data, corrects (if applicable) errors via the FEC algorithm, terminates the OTN OH, and encapsulates the pODU2 into the XAUI protocol. The pODU2 Framer & Demapper (decapsulation) circuit frames up on the pODU2 and demaps the payload, which it then sends to the 40GE (or 100GE) MAC/PCS sink point at Node B. At this point the original 40GE (or 100GE) packet stream is reconstructed following the specifications defined in IEEE 802.3.

There is no need to deskew the N (4 or 10) OTN bit streams (the N ODUs), as the 40GE and 100GE has embedded Alignment Markers (AMs). Deskewing is performed at the remote PCS layer (sink) using the AMs in order to align and reconstruct the original 40GE or 100GE signal.

A Base-KRJKR4 interface can be supported, and both BaseR signals (10GE, 40GE) and OTN signals (ODU2, ODU3) via ODUx can be transported over BaseR. This integration, together with ODUx over BaseR feature, allows a user to build a hybrid L1/L2 OTN XC and Ethernet switch using a common interface and switch devices to address the switching need for all major network signals: 10GE, 40GE, ODU2, ODU3; and the idea can adapt to 100GE and ODU4 in future. In the OTN core network, where the cross-connect granularity most likely will stay 10G (i.e. ODU2) and above, this switching architecture provides a simply and low cost solution.

FIG. 9 is a flowchart illustrating a method for transporting a high speed serial stream via a lower speed network using multiple parallel paths. Although the method is depicted as a sequence of numbered steps for clarity, the numbering does not necessarily dictate the order of the steps. It should be understood that some of these steps may be skipped, performed in parallel, or performed without the requirement of maintaining a strict order of sequence. The method starts at Step 900.

At a transmitter, Step 902 accepts either an optical or electromagnetic waveform representing a serial stream of digital information. In one aspect, either 40GE or 100GE data is accepted. Step 904 unbundles the serial stream into n virtual information streams. In one aspect, the serial stream is unbundled into framed data, where each frame includes a lane alignment marker. Step 906 divides each virtual information stream into a sequence of segments.

Step 908 encapsulates each segment, creating a sequence of packets by adding a start indicator to the beginning of each segment, and adding a terminate indicator to the end of each segment. In one aspect, start and terminate characters are added. Step 910 disinterleaves each packet across m lanes. Step 912 reinterleaves the packets into n branches of framed data. Step 914 transmits optical or electromagnetic waveforms representing the framed data, via n network branches.

In one aspect, Step 913 converts the reinterleaved packets into data framed with parity information. Then, transmitting the framed data via n network branches in Step 914 includes transmitting data framed with parity information. For example, Step 913 may convert the reinterleaved packets into OTN frames with FEC. That is, Step 913 converts to OTUk frames.

Figure 10:
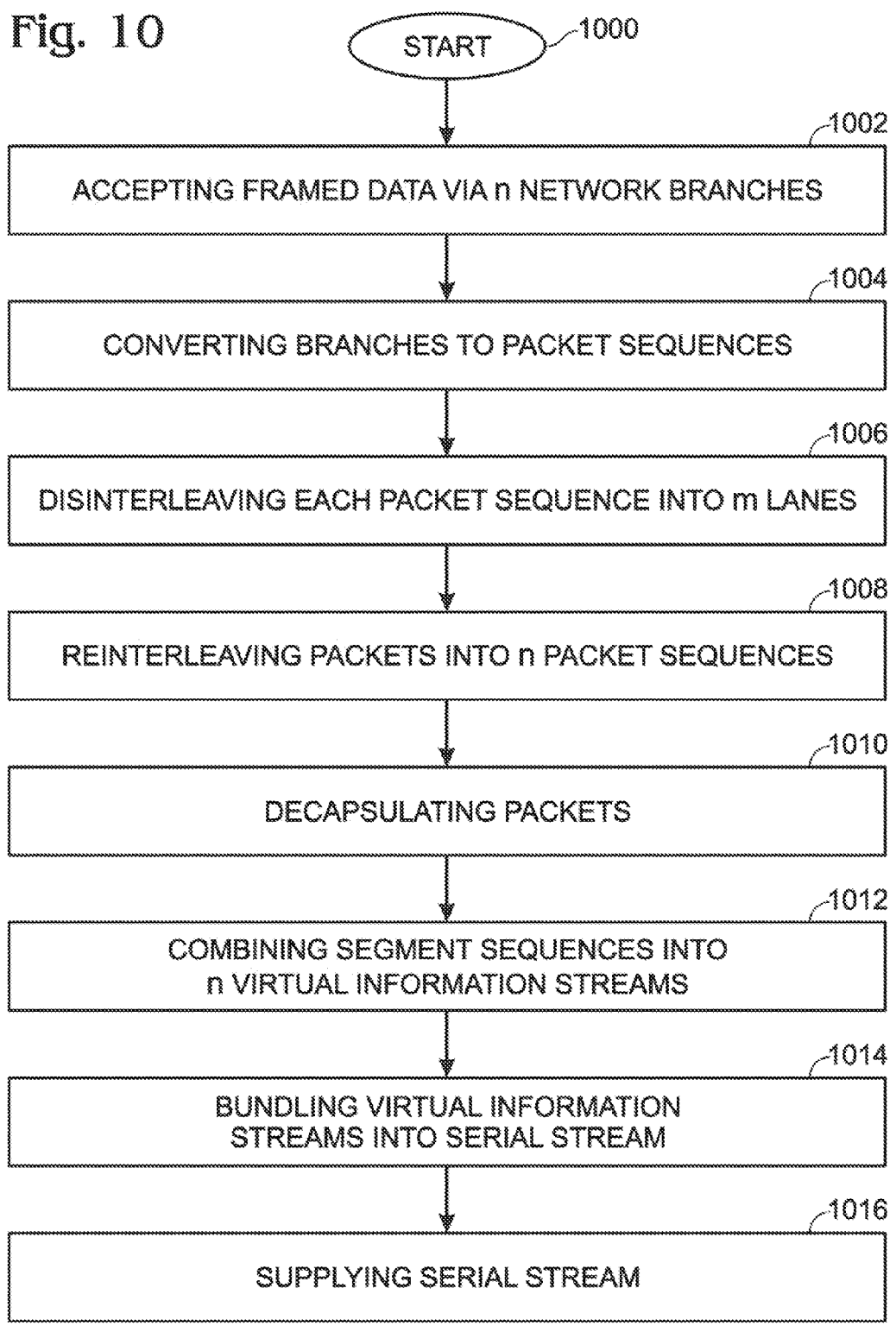
FIG. 10 is a flowchart illustrating a method for transporting a high speed serial stream via a lower speed network using multiple parallel paths.

FIG. 10 is a flowchart illustrating a method for transporting a high speed serial stream via a lower speed network using multiple parallel paths. The method starts at Step 1000. At a receiver, Step 1002 accepts an optical or electromagnetic waveform representing framed data, received via n network branches. Step 1004 converts each branch of framed data into a sequence of packets. In one aspect, Step 1002 accepts data frames with parity information, and Step 1004 uses the parity information to make corrections to the data frames. For example, Step 1002 may accept OTN frames (OTUk frames) with FEC.

Step 1006 disinterleaves each sequence of packets into m lanes. Step 1008 reinterleaves the packets into n parallel packet sequences. Step 1010 decapsulates each packet, creating a sequence of segments by removing a start indicator from the beginning of each packet, and removing a terminate indicator from the end of each packet. For example, terminate and start characters may be removed.

Step 1012 combines each sequence of segments into a virtual information stream. In one aspect, Step 1012 combines each sequence of segments into framed data, where each frame includes a lane alignment marker. Step 1014 bundles the n virtual information streams into a serial stream of digital information. Step 1016 supplies an optical or electromagnetic waveform representing the serial stream. In one aspect, Step 1016 supplies information in either the 40GE or 100GE format.

FIG. 11 is a flowchart illustrating an alternate method for transporting a high speed serial stream via a lower speed network using multiple parallel paths. The method starts at Step 1100. At a receiver, Step 1102 accepts an optical or electromagnetic waveform representing framed data, received via n network branches. Step 1104 converts each branch of framed data into a sequence of packets. Step 1106 disinterleaves each sequence of packets into m lanes. Step 1108 decapsulates each disinterleaved packet into a sequence of disinterleaved segments by removing a start indicator from the beginning of each disinterleaved packet, and removing a terminate indicator from the end of each disinterleaved packet.

Step 1110 reinterleaves the disinterleaved segment sequences into n virtual information streams. Step 1112 bundles the n virtual information streams into a serial stream of digital information. Step 1114 supplies an optical or electromagnetic waveforms representing the serial stream.

Additional details of the method are mentioned in the explanation of FIG. 10, but are omitted here in the interest of brevity. Although not explicitly described in the interest of brevity, an alternate transmitter method follows from the explanation of FIG. 11. The alternate transmitter method is essentially the same as the method of FIG. 9, except that the order of Steps 908 and 910 are reversed.

A system and method have been provided transporting a high speed serial stream via a lower speed network using multiple parallel paths. Examples of particular circuitry and protocols have been given to illustrate the invention. However, the invention is not limited to merely these examples. Likewise, examples have been given in the context of the XAUI protocol and particular data rates. Again the invention is not limited to these examples. Other variations and embodiments of the invention will occur to those skilled in the art.

We claim:

1. A method for transmitting Ethernet data in Optical Transport Network (OTN) data streams, the method comprising:
   at a transmitter, accepting a serial data stream of digital information in an Ethernet format at a first data rate;
   unbundling the Ethernet format serial stream into n virtual information streams of packetized data, each virtual information stream having a second data rate equal to (the first data rate/n);
   for each of the n virtual information streams, transporting the information stream of packetized data via a corresponding X_Attachment Unit Interface-like (XAUI-like) interface, where each XAUI-like interface uses the same protocol as XAUI but is able to operate at higher data rates;
   for each of the n virtual information stream, framing the packets in an OTN format; and
   transmitting the framed data via n network branches at the second data rate.

2. The method of claim 1 wherein transporting each virtual information stream of packetized data via the corresponding XAUI-like interface includes:
   disinterleaving the packets in each virtual information stream across four lanes; and,
   for each XAUI-like interface, reinterleaving packets from the four lanes into a virtual information stream.

3. The method of claim 2 wherein unbundling the serial stream into n virtual information streams of packetized data includes:
   dividing each virtual information stream into a sequence of segments;
   encapsulating each segment, creating a packet, by:
      adding a start indicator to the beginning of each segment; and,
      adding a terminate indicator to the end of each segment.

4. The method of claim 1 wherein accepting the serial stream of digital information in the Ethernet format includes accepting information in a format selected from a group consisting of 40 gigabit Ethernet (GE) and 100GE.

5. The method of claim 2 wherein unbundling the serial stream into n virtual information streams includes:
   unbundling the serial stream into framed data, where each frame includes a lane alignment marker; and,
   converting the framed data into packets.

6. A method for receiving Optical Transport Network (OTN) data streams as Ethernet data, the method comprising:
   at a receiver, accepting information streams of OTN framed data via n network branches, each network branch having a first data rate;
   deframing each information stream of OTN framed data into a virtual information stream of packetized data;
   transporting each virtual information stream of packetized data via a X Attachment Unit Interface-like (XAUI-like) interface, where the XAUI-like interface uses the same protocol as XAUI, but is able to operate at higher data rates;
   bundling the n virtual information streams of packetized data into a single information stream of digital information; and,
   supplying the single information stream in an Ethernet format having a second data rate, equal to (the first data rate)(n).

7. The method of claim 6 wherein transporting each virtual information stream of packetized data via a XAUI-like interface includes:
   disinterleaving the packets from each virtual information stream of packetized data across four lanes; and,
   for each XAUI-like interface, reinterleaving packets from the four lanes into a virtual information stream.

8. The method of claim 7 bundling the n virtual information streams into the single information stream includes:
   decapsulating each packet to form a segment by:
      removing a start indicator from the beginning of each packet;
      removing a terminate indicator from the end of each packet; and,
      bundling n virtual information stream of segments into a single information stream of segments.

9. The method of claim 6 wherein supplying the serial stream of digital information in the Ethernet format includes supplying information in a format selected from a group consisting of 40 gigabit Ethernet (GE) and 100GE.

10. The method of claim 7 wherein bundling the n virtual information streams of packetized data into the single information stream includes:
    converting the packets into segments; and,
    organizing the segments into frames.

11. A communications device for converting Ethernet data into a plurality of lower data rate Optical Transport Network (OTN) data streams for transmission, the communications device comprising:
    a debundling module having an input to accept a serial data stream of digital information in an Ethernet format at a first data rate, the debundling module unbundling the Ethernet format serial stream and supplying n virtual information streams of packetized data via n corresponding outputs, each virtual information stream having a second data rate that is equal to (the first data rate/n);
    (n) X Attachment Unit Interface-like (XAUI-like) modules, each XAUI-like module having an input to accept a virtual information stream of packetized data and an output to supply a virtual information stream of packetized data, where the XAUI-like interface uses the same protocol as XAUI but is able to operate at higher data rates;
    (n) framers, each framer having an input to accept a virtual information stream of packetized data from a corresponding XAUI-like module, and an output to supply the packets framed in an OTN format; and
    (n) transmitters, each transmitter transmitting framed data via a network branch at the second data rate.

12. The communications device of claim 11 wherein each XAUI-like module disinterleaves the packets in each virtual information stream across four lanes, and subsequent to transport across a XAUI-like interface, reinterleaves packets from the four lanes into a virtual information stream.

13. The communications device of claim 12 wherein the debundling module unbundles the Ethernet serial stream into n virtual information streams of packetized data as follows:
    dividing each virtual information stream into a sequence of segments;
    encapsulating each segment, creating a packet, by:
       adding a start indicator to the beginning of each segment; and,
       adding a terminate indicator to the end of each segment.

14. The communications device of claim 11 wherein the debundling module accepts information in a format selected from a group consisting of 40 gigabit Ethernet (GE) and 100GE.

15. The communications device of claim 12 wherein the debundling module:
unbundles the Ethernet serial stream into framed data, where each frame includes a lane alignment marker; and,
converting the framed data into packets.

16. A communications device for converting a plurality of received Optical Transport Network (OTN) data streams into higher data rate Ethernet data, the communications device comprising:
(n) receivers, each receiver accepting information streams of OTN framed data via a network branch at a first data rate;
(n) deframers, each deframer deframing a corresponding information stream of OTN framed data into a virtual information stream of packetized data;
(n) X Attachment Unit Interface-like (XAUI-like) modules, each XAUI-like module having an input to accept a virtual information stream of packetized data and an output to supply a virtual information stream of packetized data, where the XAUI-like interface uses the same protocol as XAUI but is able to operate at higher data rates; and,
a bundling module having n inputs, each input accepting a corresponding virtual information stream of packetized data, the bundling module bundling the n virtual information streams of packetized data into a single information stream of digital information, and supplying the single information stream in an Ethernet format having a second data rate, equal to (the first data rate)(n).

17. The communications device of claim 16 wherein each XAUI-like module disinterleaves the packets in each virtual information stream across four lanes, and subsequent to transport across a XAUI-like interface, reinterleaves packets from the four lanes into a virtual information stream.

18. The communications device of claim 17 wherein the bundling module bundles the n virtual information streams into the single information stream as follows:
decapsulating each packet to form a segment by:
removing a start indicator from the beginning of each packet;
removing a terminate indicator from the end of each packet; and,
bundling n virtual information stream of segments into a single information stream of segments.

19. The communications device of claim 16 wherein the bundling module supplies information in a format selected from a group consisting of 40 gigabit Ethernet (GE) and 100GE.

20. The communications device of claim 17 wherein the bundling module converts the packets in each virtual information stream into segments, and organizes the segments into frames.

21. A device for transmitting Ethernet data in Optical Transport Network (OTN) data streams, the method comprising:
a means for accepting a serial data stream of digital information in an Ethernet format at a first data rate;
a means for unbundling the Ethernet format serial stream into n virtual information streams of packetized data, each virtual information stream having a second data rate that is equal to (the first data rate/n);
for each of the n virtual information streams, a means for transporting the information stream of packetized data via a corresponding X Attachment Unit Interface-like (XAUI-like) interface, where each XAUI-like interface uses the same protocol as XAUI but is able to operate at higher data rates;
for each of the n virtual information stream, a means for framing the packets in an OTN format; and
a means for transmitting the framed data via n network branches at the second data rate.

\* \* \* \* \*